(12) United States Patent
Hernandez Aviles et al.

(10) Patent No.: US 10,160,388 B2
(45) Date of Patent: Dec. 25, 2018

(54) LOAD FLOOR ASSEMBLY INCLUDING A MULTI-OPEN POSITION MECHANISM

(71) Applicant: GM GLOBAL TECHNOLOGY OPERATIONS LLC, Detroit, MI (US)

(72) Inventors: Ernesto Hernandez Aviles, Mexico City (MX); Jose Jonathan Salazar Loera, Aguascalientes (MX); Omar Rene Hernandez Sanchez, Toluca (MX); Juan Carlos Valencia Flores, Chalco (MX)

(73) Assignee: GM Global Technology Operations LLC, Detroit, MI (US)

( * ) Notice: Subject to any disclaimer, the term of this patent is extended or adjusted under 35 U.S.C. 154(b) by 93 days.

(21) Appl. No.: 15/447,184

(22) Filed: Mar. 2, 2017

(65) Prior Publication Data
US 2018/0251071 A1    Sep. 6, 2018

(51) Int. Cl.
*B60R 11/06* (2006.01)
*B60R 5/04* (2006.01)
*B62D 25/08* (2006.01)

(52) U.S. Cl.
CPC ............ *B60R 5/044* (2013.01); *B62D 25/087* (2013.01)

(58) Field of Classification Search
CPC .............................. B60R 5/044; B62D 25/087
See application file for complete search history.

(56) References Cited

U.S. PATENT DOCUMENTS

| 5,667,268 | A  | * | 9/1997  | Bump   | B60J 5/0498 |
|           |    |   |         |        | 296/186.4   |
| 8,870,257 | B2 | * | 10/2014 | Tosco  | B60R 5/04   |
|           |    |   |         |        | 296/37.14   |
| 2004/0020957 | A1 | * | 2/2004  | Poliquin | B60R 5/04 |
|           |    |   |         |        | 224/543     |
| 2004/0105744 | A1 | * | 6/2004  | Warner | B60R 5/04   |
|           |    |   |         |        | 414/522     |
| 2006/0255611 | A1 | * | 11/2006 | Smith  | B60N 2/36   |
|           |    |   |         |        | 296/37.16   |
| 2007/0052254 | A1 | * | 3/2007  | Sturt  | B60R 5/041  |
|           |    |   |         |        | 296/26.1    |
| 2007/0065264 | A1 | * | 3/2007  | Sturt  | B60P 1/003  |
|           |    |   |         |        | 414/545     |

* cited by examiner

*Primary Examiner* — Lori L Lyjak
(74) *Attorney, Agent, or Firm* — Quinn IP Law

(57) ABSTRACT

A load floor assembly includes a storage bin including a bin body. The bin body defines an open inner cavity. The load floor assembly further includes a load floor movably coupled to the storage bin between a fully open position and a closed position. Further, the load floor is movable among a plurality of partially open positions. The load floor assembly further includes a multi-open position mechanism movably coupling the load floor to the storage bin. The multi-open position mechanism include a first link movably coupled between the storage bin and the load floor, a second link movably coupled between the storage bin and the load floor, and an elastic member coupled between the storage bin and the load floor to allow the load floor to remain stationary relative to the storage bin in the plurality of partially open positions.

20 Claims, 3 Drawing Sheets

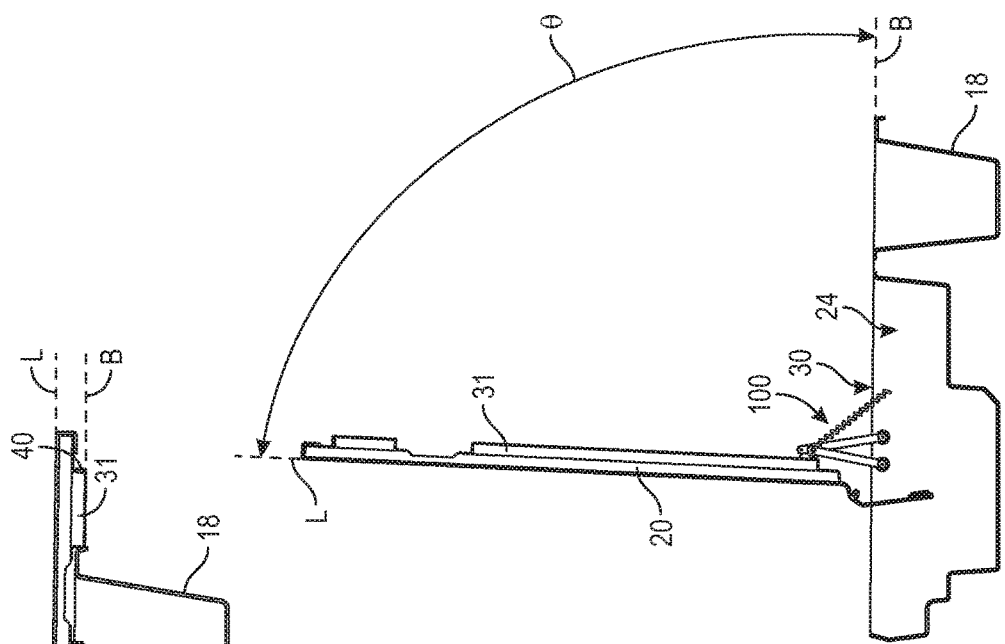
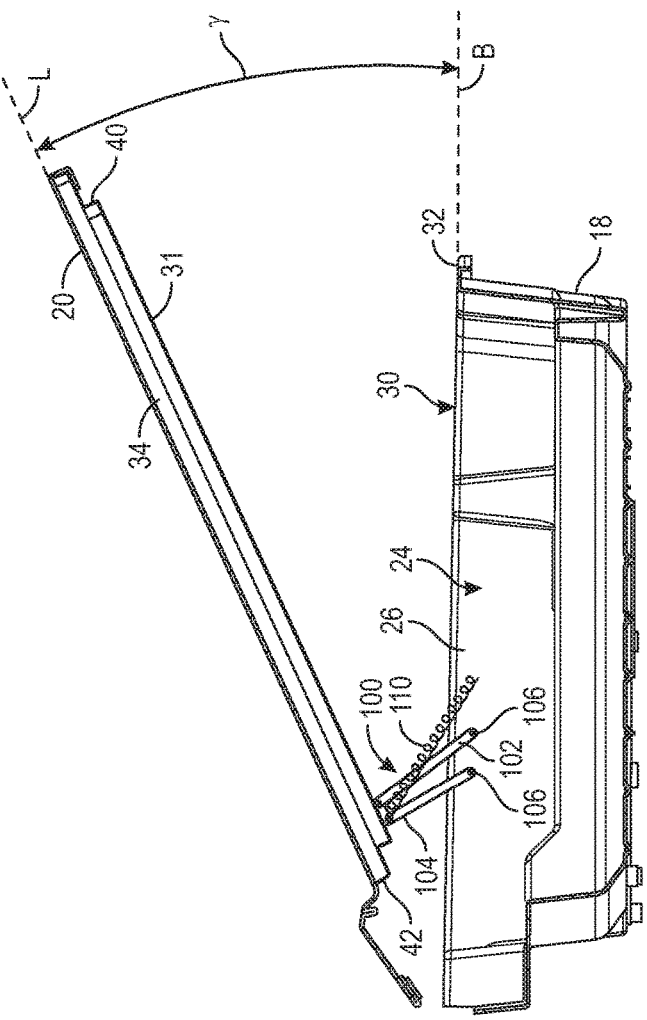
FIG. 3
FIG. 4
FIG. 5

LOAD FLOOR ASSEMBLY INCLUDING A MULTI-OPEN POSITION MECHANISM

INTRODUCTION

The present disclosure relates to a load floor assembly including a multi-open position mechanism.

Vehicles may include a load floor that is configured to support cargo in a cargo area. For example, minivans and sport-utility vehicles typically include a cargo area in the rear of the vehicle. Access to the cargo area is provided by a rear body opening that is selectively closed by a rear closure panel, such as a tailgate or a liftgate. Similarly, pickup trucks include a cargo area, i.e., a cargo box, with access to the cargo box being provided by an opening at the rear of the truck and that is selectively closed by a tailgate. The load floor forms the lower surface of the cargo area or cargo box.

SUMMARY

A load floor assembly includes a storage bin including a bin body. The bin body defines an open inner cavity. The load floor assembly further includes a load floor movably coupled to the storage bin. The load floor can move relative to the storage bin between a fully open position and a closed position. Further, the load floor is movable among a plurality of partially open positions. The load floor assembly further includes a multi-open position mechanism movably coupling the load floor to the storage bin. The multi-open position mechanism include a first link movably coupled between the storage bin and the load floor, a second link movably coupled between the storage bin and the load floor, and an elastic member coupled between the storage bin and the load floor to maintain the load floor stationary relative to the storage bin in the plurality of partially open positions.

According to an aspect of the present disclosure, the load floor assembly further comprising a bracket coupled to the load floor, the first link, and the second link.

According to an aspect of the present disclosure, the first link is pivotally coupled to the bracket.

According to an aspect of the present disclosure, the second link is pivotally coupled to the bracket.

According to an aspect of the present disclosure, the first link and the second link are each configured as a bar.

According to an aspect of the present disclosure, the elastic member is configured as a spring.

According to an aspect of the present disclosure, each of the first link and the second link is directly and pivotally coupled to the bracket.

According to an aspect of the present disclosure, each of the first link and the second link is directly and pivotally coupled to the storage bin.

According to an aspect of the present disclosure, the load floor defines an angle relative to the storage bin, and the elastic member is configured to maintain the load floor stationary relative to the storage bin when the angle is equal to or greater than twenty degrees.

According to an aspect of the present disclosure, the load floor assembly further includes a bracket coupled to the load floor, the first link, and the second link. The elastic member is coupled to the bracket and is directly coupled to the storage bin.

The present disclosure also describes vehicles. According to an aspect of the present disclosure, the vehicle includes a vehicle body defining a cargo compartment. The cargo compartment includes a storage bin including a bin body. The bin body defines an open inner cavity. The cargo compartment further includes a load floor movably coupled to the storage bin. The load floor is movable relative to the storage bin between a fully open position and a closed position. The load floor is movable among a plurality of partially open positions between the fully open position and the closed position. The cargo compartment further includes a multi-open position mechanism movably coupling the load floor to the storage bin. The multi-open position mechanism includes a first link movably coupled between the storage bin and the load floor and a second link movably coupled between the storage bin and the load floor. The multi-open position mechanism further includes an elastic member coupled between the storage bin and the load floor to maintain the load floor stationary relative to the storage bin in the plurality of partially open positions.

According to an aspect of the present disclosure, the vehicle further includes a bracket coupled to the load floor, the first link, and the second link.

According to an aspect of the present disclosure, the first link is pivotally coupled to the bracket.

According to an aspect of the present disclosure, the load floor defines an angle relative to the storage bin, and the elastic member is configured to maintain the load floor stationary relative to the storage bin when the angle is equal to or greater than twenty degrees.

According to an aspect of the present disclosure the multi-open position mechanism is a first multi-open position mechanism. The vehicle further includes a second multi-open position mechanism. The first multi-open position mechanism is structurally identical to the second multi-open position mechanism. The load floor includes a floor body and a floor cover attached to the floor body. The floor body includes a first lateral wall and a second lateral wall opposite the first lateral wall. The floor body includes a front body wall directly interconnecting the first lateral wall and the second lateral wall. The floor body further includes a rear body wall opposite the front body wall. The rear body wall directly interconnects the first lateral wall and the second lateral wall. The first multi-open position mechanism is closer to first lateral wall than to the second lateral wall of the load floor. The second multi-open position mechanism is closer to the second lateral wall than to the first lateral wall of the load floor. The bin body includes a front bin wall and a rear bin wall opposite the front bin wall. The bin body further includes a first bin sidewall and a second bin sidewall opposite the first bin sidewall. The first bin sidewall is coupled between the front bin wall and the rear bin wall. The second bin sidewall is coupled between the front bin wall and the rear bin wall. The first multi-open position mechanism is closer to the first bin sidewall than to the second bin sidewall. The second multi-open mechanism is closer to the second bin sidewall than to the first bin sidewall. Each of the first multi-open position mechanism and the second multi-open position mechanism is closer to the rear body wall than to the front body. The load floor is coupled to the storage bin solely by the first multi-open position mechanism and the second multi-open position mechanism. Each of the first multi-open position mechanism and the second multi-open position mechanism solely includes the first link, the second link, the elastic member, the bracket, the first pivot pin, the second pivot pin, the third pivot pin, and the fourth pivot pin. Each multi-open position mechanism may include a first pivot pin pivotally and directly coupling the first link to the bracket. Further, each of the multi-open position mechanism includes a second pivot pin pivotally and directly coupling the first link to the storage bin. Moreover, each multi-open position mechanism includes a third pivot pin pivotally and directly coupling the second link to the bracket. Each multi-open position mechanism further includes a fourth pivot pin pivotally and directly coupling the second link to the storage bin.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 3 is a schematic, cross-sectional side view of the load floor assembly shown in FIG. 1, depicting the load floor in a closed position.

FIG. 4 is a schematic, cross-sectional side view of the load floor assembly shown in FIG. 1, depicting the load floor in a partially open position.

FIG. 5 is a schematic, cross-sectional side view of the load floor assembly shown in FIG. 1, depicting the load floor in a fully open position.

DETAILED DESCRIPTION

Figure 1:
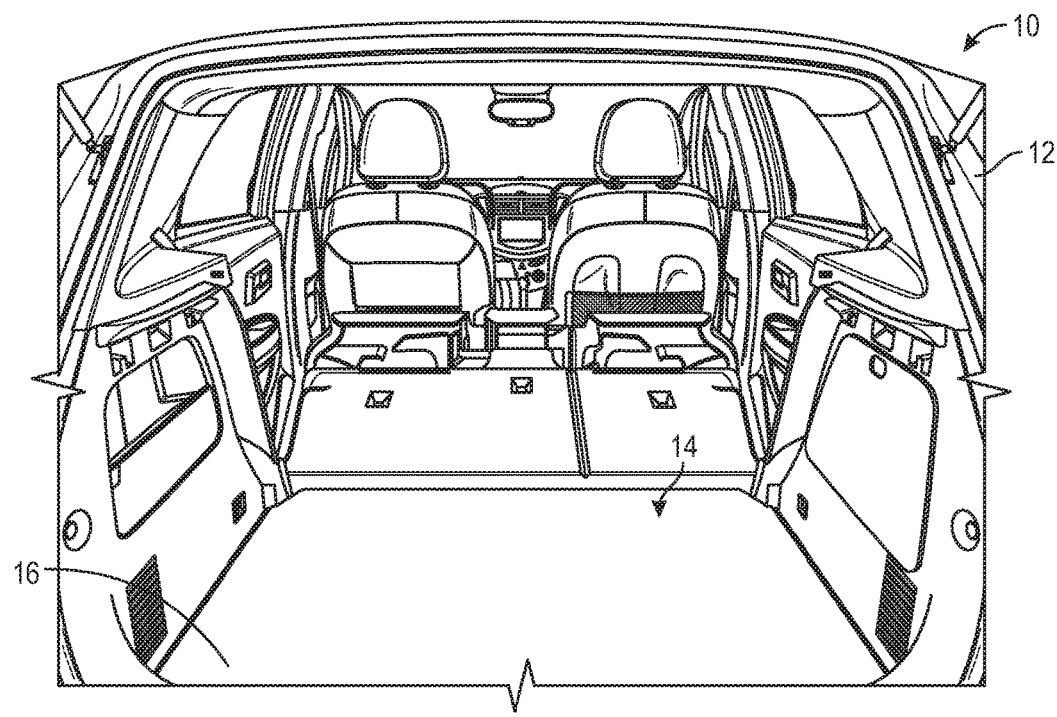
FIG. 1 is a schematic, rear view of a vehicle including a cargo compartment, wherein the cargo compartment includes a load floor assembly.

Referring to the drawings, wherein like reference numbers correspond to like or similar components throughout the several figures, and beginning with FIG. 1, a vehicle 10 includes a vehicle body 12. It is contemplated that the vehicle 10 may be a car, sports utility vehicle, or any other vehicle suitable for transporting objects and/or passengers. The vehicle body 12 has a cargo compartment 14 configured, shaped, and sized to hold cargo. The cargo compartment 14 includes a load floor assembly 16 configured to hold the weight of cargo inside the cargo compartment 14.

Figure 2:
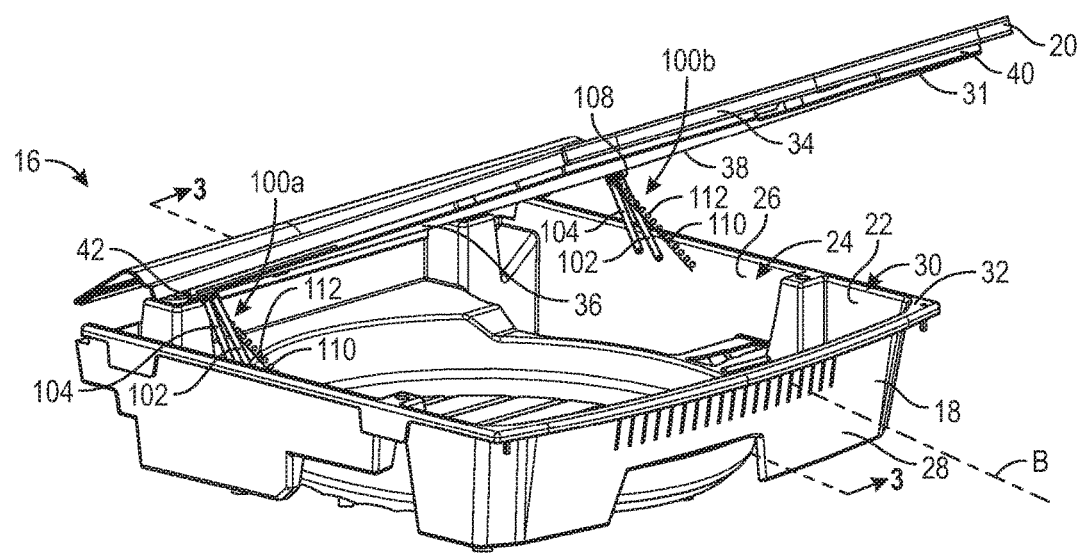
FIG. 2 is a schematic, perspective view of the load floor assembly shown in FIG. 1.

With reference to FIG. 2, the load floor assembly 16 includes a storage bin 18 and a load floor 20 movably coupled to the storage bin 18. The storage bin 18 includes a bin body 22 defining an open inner cavity 24. The open inner cavity 24 of the bin body 22 is configured, shaped, and sized to receive a tire, such as a spare tire. The bin body 22 has an inner bin surface 26 and an outer bin surface 28 opposite the inner bin surface 26. The inner bin surface 26 defines the open inner cavity 24. The bin body 22 also defines an opening 30 leading to the open inner cavity 24. The storage bin 18 further includes a rim 32 at least partially surrounding the opening 30. The rim 32 may be substantially planar along a bin axis B in order to support the load floor 20. The bin body 22 includes a front bin wall 44 and a rear bin wall 46 opposite the front bin wall 44. The bin body 22 further includes a first bin sidewall 48 and a second bin sidewall 50 opposite the first bin sidewall 50. The first bin sidewall 48 is coupled between the front bin wall 44 and the rear bin wall 46. The second bin 50 sidewall is coupled between the front bin wall 44 and the rear bin wall 46.

With reference to FIGS. 2-5, the load floor 20 may be substantially planar along a floor axis L in order to support cargo and is movably coupled to the storage bin 18 and can therefore move between a closed position (shown in FIG. 3) and a fully open position (FIG. 5). In addition, the load floor 20 can move through a plurality of partially open positions (FIGS. 6-8) between the fully open position (FIG. 5) and the closed position (shown in FIG. 3). In the fully closed position, the load floor 20 covers the opening 30 leading to the open inner cavity 24 of the storage bin 18, and the bin axis B and the floor axis L are substantially parallel to each other. Therefore, an angle γ between the floor axis L and the bin axis B is about zero when the load floor 20 is in the closed position relative to the storage bin 18. When the load floor 20 is in the fully open position, the load floor 20 does not cover the entire opening 30 leading to the open inner cavity 24, and the angle γ the floor axis L and the bin axis B is about ninety degrees, thereby allowing easy access to the open inner cavity 24 of the storage bin 18.

With specific reference to FIG. 2, the load floor 20 includes a floor body 31, such as a support panel, and a floor cover 34 attached to the floor body 31. The floor body 31 includes a first lateral wall 36 and a second lateral wall 38 opposite the first lateral wall 36. Additionally, the floor body 31 includes a front body wall 40 directly interconnecting the first lateral wall 36 and the second lateral wall 38. The floor body 31 further includes a rear body wall 42 opposite the front body wall 40. The rear body wall 42 directly interconnects the first lateral wall 36 and the second lateral wall 38.

With reference again to FIGS. 2-5, the load floor 20 can remain stationary relative to the storage bin 18 in the plurality of partially open positions and the fully open position. As a result, a user does not need to hold the load floor 20 open while he accesses and/or searches inside the storage bin 18. Rather, the user can simply open the load floor 20 to the desired position (i.e., any of the partially open positions or the fully open position) and then release the load floor 20. The load floor 20 then remains open without any human effort, allowing the user to use both hands to access and/or search the open inner cavity 24 of the storage bin 18. To accomplish this, the load floor assembly 16 further includes a multi-open position mechanism 100 movably coupling the load floor 20 to the storage bin 18.

With continued reference to FIGS. 2-6, the multi-open position mechanism 100 maintains the load floor 20 stationary in any of the partially open positions or the fully open position when no external force is applied to the load floor 20. As a non-limiting example, the multi-open position mechanism 100 can maintain the load floor 20 stationary relative to the storage bin 18 only when no external force is applied to the load floor 20 and only when the load floor 20 is in any of the partially open positions or the fully open position. In the depicted embodiment, the load floor assembly 16 includes two multi-open position mechanisms 100. In this embodiment, the load floor assembly 16 includes a first multi-open position mechanism 100a and a second multi-open position mechanism 100b. The first multi-open position mechanism 100a is structurally identical to the second multi-open position mechanism 100b. However, the first multi-open position mechanism 100a is closer to first lateral wall 36 than to the second lateral wall 38 of the load floor 20, and a second multi-open position mechanism 100b is closer to the second lateral wall 38 than to the first lateral wall 36 of the load floor 20 to enhance the structure stability of the load floor assembly 16. It is contemplated, however, that the load floor assembly 16 may include a single multi-open position mechanism 100 or more than two multi-open position mechanisms 100. Regardless of the quantity, the multi-open position mechanism 100 is disposed closer to the rear body wall 42 than to the front body wall 40 of the load floor 20 in order to facilitate access the storage bin 18 when the load floor 20 is in the fully open position or any of the partially open positions. In the depicted embodiment, each of the first multi-open position mechanism 100a and the second multi-open position mechanism 100b is closer to the rear body wall 42 than to the front body 40 to facilitate opening the load floor 20. The first multi-open position mechanism 100a is closer to the first bin sidewall 48 than to the second bin sidewall 50, and the second multi-open mechanism 100b is closer to the second bin sidewall 50 than to the first bin sidewall 48 to enhance the structure stability of the load floor assembly 16.

In the depicted embodiment, each multi-open position mechanism 100 includes a first link 102 and a second link 104 each movably coupled between the storage bin 18 and the load floor 20. The first link 102 and the second link 104 are configured made of a substantially rigid material, such as a rigid metal, and may be configured as bars. The first link 102 and the second link 104 are both movably coupled to the inner bin surface 26 of the storage bin 18. As a non-limiting example, pivot pins 106 (FIG. 6) can directly and pivotally couple the first link 102 and the second link 104 to the inner bin surface 26 of the storage bin 18. As such, the first link 102 and the second link 104 can move (e.g., pivot) relative to the storage bin 18.

The multi-open position mechanism 100 further includes a bracket 108 directly coupled to the load floor 20, the first link 102, and the second link 104. The bracket 108 is fixed to the load floor 20. As such, the bracket 108 remains stationary relative to the load floor 20. The first link 102 and the second link 104 are both movably coupled to the bracket 108. As a non-limiting example, pivot pins 106 can directly and pivotally coupled the first link 102 and the second link 104 to the bracket 108. Accordingly, the first link 102 and the second link 104 are both movably (e.g., pivotally) coupled between the storage bin 18 and the load floor 20.

Each multi-open position mechanism 100 further an elastic member 110 coupled between storage bin 18 and the load floor 20. Specifically, the elastic member 110 may be directly coupled to the inner bin surface 26 of the storage bin 18. The elastic member 110 may be coupled to the bracket 108. For example, the elastic member 110 may be directly coupled to the pivot pin 106 interconnecting the first link 102 and the bracket 108. As discussed below, the elastic member 110 is configured, shaped and sized to apply a force to the load floor 20 to hold the load floor 20 in the fully open position or any of the plurality of partially open positions. In the depicted embodiment, the elastic member 110 is configured as a spring 112, such as a coil spring. It is envisioned, however, that the elastic member 110 may alternatively (or additionally) be an elastic band or any other suitable elastic object that behaves in accordance with Hooke's law. The elastic member 110 may be directly coupled to the bracket 108 and the inner bin surface 26 of the storage bin 18.

Each multi-open position mechanism 100 may include a first pivot pin 106a pivotally and directly coupling the first link 102 to the bracket 108. Further, each of the multi-open position mechanism 100 includes a second pivot pin 106b pivotally and directly coupling the first link 102 to the storage bin 18. Moreover, each multi-open position mechanism 100 includes a third pivot pin 106c pivotally and directly coupling the second link 104 to the bracket 108. Each multi-open position mechanism 100 further includes a fourth pivot pin 106d pivotally and directly coupling the second link 104 to the storage bin 18. In the depicted embodiment, the storage bin 18 defines a hole 19, and the elastic member 110 is partly disposed through the hole 19. Accordingly, the elastic member 110 is directly coupled to the storage bin 18. The elastic member 110 may also be directly coupled to the first pivot pin 106a. The structural connections described in this paragraph assist in pivotally and securely coupling the storage bin 18 to the load floor 20. Further, each multi-open position mechanism 100 may be characterized by the absence of objects other than the first link 102, the second link 104, the elastic member 110, the bracket 108, the first pivot pin 106a, the second pivot pin 106b, the third pivot pin 106c, and the fourth pivot pin 106d in order to minimize part count. In other words, each of the first multi-open position mechanism 100a and the second multi-open position mechanism 100b solely includes the first link 102, the second link 104, the elastic member 110, the bracket 108, the first pivot pin 106a, the second pivot pin 106b, the third pivot pin 106c, and the fourth pivot pin 106d in order to minimize part count. Further, as a non-limiting example, the load floor 20 may be movably coupled to the storage bin 18 solely by the first multi-open position mechanism 100a and the second multi-open position mechanism 100b in order to minimize part count. In other words, aside from the e first multi-open position mechanism 100a and the second multi-open position mechanism 100b, no other objects interconnect the load floor 20 and the storage bin 18.

With specific reference to FIGS. 4 and 5, a first distance D1 is defined from the rear bin wall 46 of the storage bin 18 to the fourth pivot pin 106d along the bin axis B. A second distance D2 is defined from the rear bin wall 46 to the second pivot pin 106b along the bin axis B. A third distance D3 is defined from the rear bin wall 46 to the hole 19 along the bin axis B. The third distance D3 is greater than the first distance D1 and the second distance D2 to enhance the structure stability of the load floor assembly 16. The second distance D2 is greater than the first distance D1 enhance the structure stability of the load floor assembly 16. A fourth distance D4 is defined from the fourth pivot pin 106d to the second pivot pin 106b along the bin axis B. A fifth distance D5 is defined from the second pivot pin 106b to the hole 19. A sixth distance D6 is defined from the fourth pivot pin 106d to the hole 19. The sixth distance D6 is greater than the fourth distance D4 and the fifth distance D5 to enhance the structure stability of the load floor assembly 16. The first distance D1 is greater than the sixth distance D6 to enhance the structure stability of the load floor assembly 16. The second distance D2 is greater than the sixth distance D6 to enhance the structure stability of the load floor assembly 16. The third distance D3 is greater than the sixth distance D6 to enhance the structure stability of the load floor assembly 16.

Figure 6:
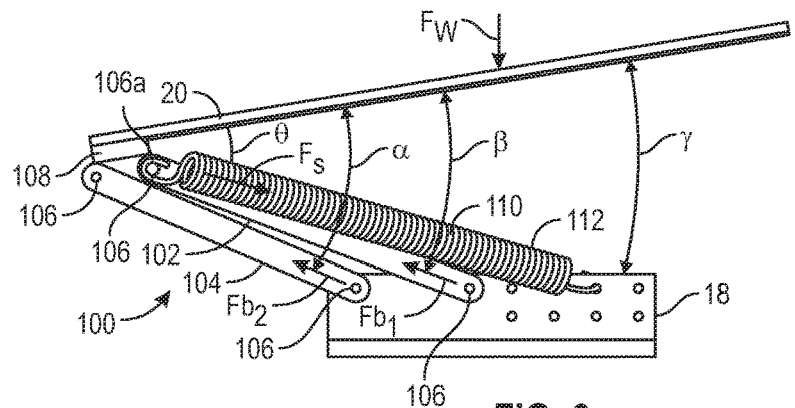
FIG. 6 is a schematic, fragmentary side view of the load floor assembly shown in FIG. 1, depicting the load floor in one of the partially open positions.
Figure 7:
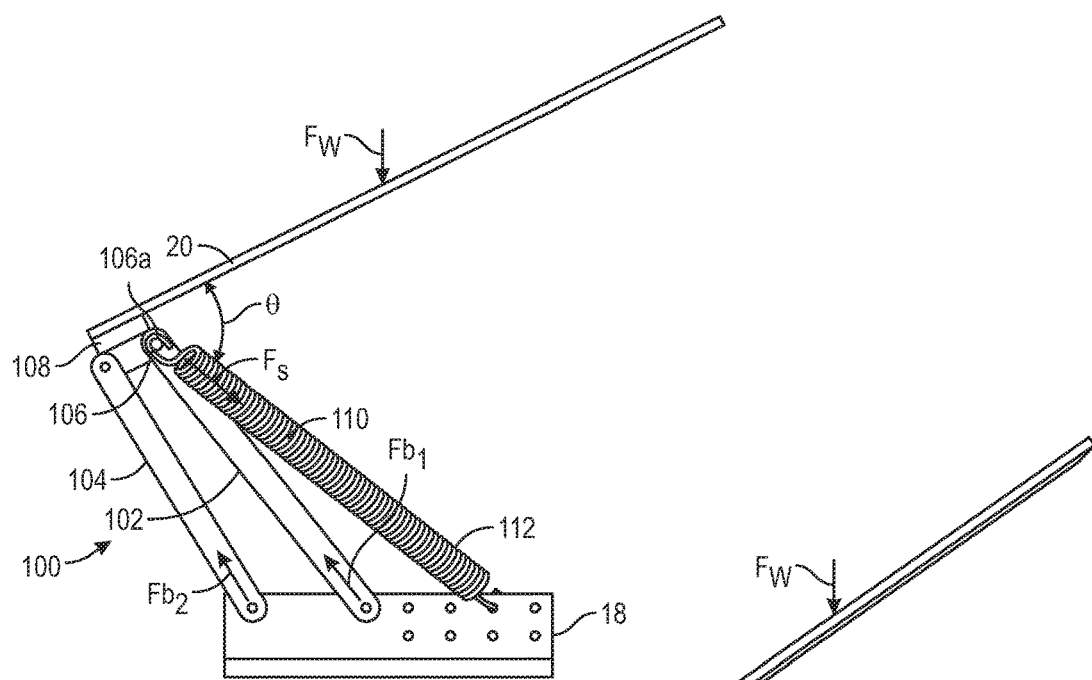
FIG. 7 is a schematic, fragmentary side view of the load floor assembly shown in FIG. 1, depicting the load floor in another partially open position.

With reference to FIGS. 6-7, when the load floor 20 is moved from the closed position (FIG. 3) to any of the partially open positions or to the fully open position (FIG. 5), the elastic member 110 applies an elastic force Fs to load floor assembly 16. As a result, the forces acting on the load floor assembly 16 are balanced, thereby allowing the load floor 20 to remain in any of the partially open positions or to the fully open position (FIG. 5). The forces acting on the load floor assembly 16 includes the first link force Fb1, the second link force Fb2, and the load floor weight Fw. The load floor assembly 16 behaves in accordance with the following equations:

$$\Sigma Fx = 0 = Fs \cos\theta - Fb1 \cos\beta - Fb2 \cos\alpha$$

$$\Sigma F y=0=-F w-F s \sin \theta+F b 1 \sin \beta+F b 2 \sin \alpha$$

wherein:
Fy are the forces acting on the load floor assembly 16 in the vertical direction;
Fx are the forces acting on the load floor assembly 16 in the horizontal direction;
Fb1 is the force exerted by the first link 102 on the load floor assembly 16;
Fb2 is the force exerted by the second link 104 on the load floor assembly 16;
Fs is the elastic force exerted by the elastic member 110 on the load floor assembly 16;
Fw is the weight of the load floor 20;
θ is the angle between the load floor 20 and the elastic member 110;
α the angle between the load floor 20 and the first link 102; and
β the angle between the load floor 20 and the second link 104.

Figure 8:
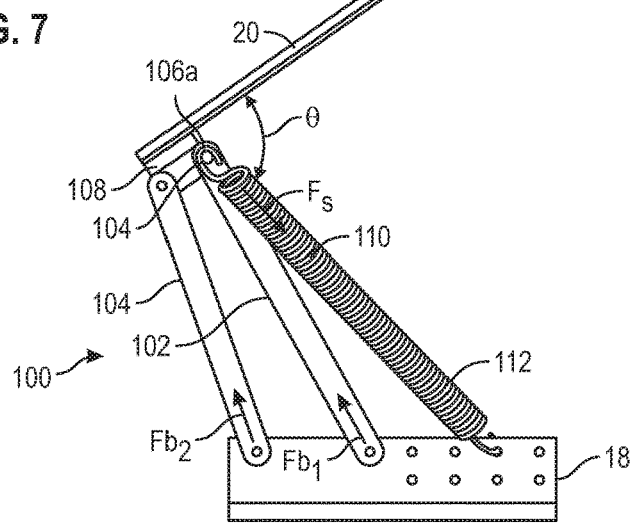
FIG. 8 is a schematic, fragmentary side view of the load floor assembly shown in FIG. 1, depicting the load floor in yet another partially open position.

As shown in FIGS. 6-8, the forcing action on the load floor assembly 16 are balanced, because the elastic force Fs is always in an opposite direction to both of the first link force Fb1 and the second link force Fb2 and serves as a constant force that varies in magnitude and orientation depending on the position of the load floor 20 relative to the storage bin 18. As a result, the load floor 20 can remain stationary relative to the storage bin 18 when the load floor 20 is in either the fully open position (FIG. 5) or any of the partially open positions (FIGS. 6-8). As non-limiting example, the elastic member 110 is configured to maintain the load floor 20 stationary relative to the storage bin 18 when the angle γ (i.e., the angle between the load floor 20 and the storage bin 18) is equal to or greater than twenty degrees to allow a user to comfortably access the open inner cavity 24 of the storage bin 18. As a non-limiting example, the elastic member 110 is configured to maintain the load floor 20 stationary relative to the storage bin 18 solely when the angle γ (i.e., the angle between the load floor 20 and the storage bin 18) is equal to or greater than twenty degrees to allow a user to comfortably access the open inner cavity 24 of the storage bin 18

While the best modes for carrying out the teachings have been described in detail, those familiar with the art to which this disclosure relates will recognize various alternative designs and embodiments for practicing the teachings within the scope of the appended claims. The vehicle 10 and multi-open position mechanism 100 illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings.

The invention claimed is:

1. A load floor assembly, comprising:
a storage bin including a bin body, wherein the bin body defines an open inner cavity;
a load floor movably coupled to the storage bin, wherein the load floor is movable relative to the storage bin between a fully open position and a closed position, and the load floor is movable among a plurality of partially open positions between the fully open position and the closed position;
a multi-open position mechanism movably coupling the load floor to the storage bin, wherein the multi-open position mechanism includes:
a first link movably coupled between the storage bin and the load floor;
a second link movably coupled between the storage bin and the load floor; and
an elastic member coupled between the storage bin and the load floor to maintain the load floor stationary relative to the storage bin in the plurality of partially open positions.

2. The load floor assembly of claim 1, further comprising a bracket coupled to the load floor, the first link, and the second link.

3. The load floor assembly of claim 2, wherein the first link is pivotally coupled to the bracket.

4. The load floor assembly of claim 3, wherein the second link is pivotally coupled to the bracket.

5. The load floor assembly of claim 4, wherein the first link and the second link are each configured as a bar.

6. The load floor assembly of claim 4, wherein the elastic member is configured as a spring.

7. The load floor assembly of claim 4, wherein each of the first link and the second link is directly and pivotally coupled to the bracket.

8. The load floor assembly of claim 7, wherein each of the first link and the second link is directly and pivotally coupled to the storage bin.

9. The load floor assembly of claim 1, wherein the load floor defines an angle relative to the storage bin, and the elastic member is configured to maintain the load floor stationary relative to the storage bin when the angle is equal to or greater than twenty degrees.

10. The load floor assembly of claim 1, further comprising a bracket coupled to the load floor, the first link, and the second link, wherein the elastic member is coupled to the bracket and is directly coupled to the storage bin.

11. A vehicle, comprising:
a vehicle body defining a cargo compartment, wherein the cargo compartment includes:
a storage bin including a bin body, wherein the bin body defines an open inner cavity;
a load floor movably coupled to the storage bin, wherein the load floor is movable relative to the storage bin between a fully open position and a closed position, and the load floor is movable among a plurality of partially open positions between the fully open position and the closed position;
a multi-open position mechanism movably coupling the load floor to the storage bin, wherein the multi-open position mechanism includes:
a first link movably coupled between the storage bin and the load floor;
a second link movably coupled between the storage bin and the load floor; and
an elastic member coupled between the storage bin and the load floor to allow the load floor to remain stationary relative to the storage bin in the plurality of partially open positions.

12. The vehicle of claim 11, further comprising a bracket coupled to the load floor, the first link, and the second link.

13. The vehicle of claim 12, wherein the first link is pivotally coupled to the bracket.

14. The vehicle of claim 13, wherein the second link is pivotally coupled to the bracket.

15. The vehicle of claim 14, wherein the first link and the second link are each configured as a bar.

16. The vehicle of claim 11, wherein the elastic member is configured as a spring.

17. The vehicle of claim 11, further comprising a bracket coupled to the load floor, the first link, and the second link, wherein each of the first link and the second link is directly and pivotally coupled to the bracket.

18. The vehicle of claim 17, wherein each of the first link and the second link is directly and pivotally coupled to the storage bin.

19. The vehicle of claim 11, wherein the load floor defines an angle relative to the storage bin, and the elastic member is configured to maintain the load floor stationary relative to the storage bin when the angle is equal to or greater than twenty degrees.

20. The vehicle of claim 11, wherein the vehicle further includes a bracket directly coupled to the load floor, the first link is pivotally coupled to the bracket, the second link is pivotally coupled to the bracket, the first link and the second link are each configured as a bar, the elastic member is configured as a spring, the multi-open position mechanism is a first multi-open position mechanism, the load floor defines an angle relative to the storage bin, and the elastic member is configured to maintain the load floor stationary relative to the storage bin solely when the angle is equal to or greater than twenty degrees, the multi-open position mechanism includes a first pivot pin pivotally and directly coupling the first link to the bracket, the multi-open position mechanism includes a second pivot pin pivotally and directly coupling the first link to the storage bin, the multi-open position mechanism includes a third pivot pin pivotally and directly coupling the second link to the bracket, the multi-open position mechanism further includes a fourth pivot pin pivotally and directly coupling the second link to the storage bin, the vehicle further includes a second multi-open position mechanism, the first multi-open position mechanism is structurally identical to the second multi-open position mechanism, the load floor includes a floor body and a floor cover attached to the floor body, the floor body includes a first lateral wall and a second lateral wall opposite the first lateral wall, the floor body includes a front body wall directly interconnecting the first lateral wall and the second lateral wall, the floor body further includes a rear body wall opposite the front body wall, the rear body wall directly interconnects the first lateral wall and the second lateral wall, the first multi-open position mechanism is closer to first lateral wall than to the second lateral wall of the load floor, and the second multi-open position mechanism is closer to the second lateral wall than to the first lateral wall of the load floor, the bin body includes a front bin wall and a rear bin wall opposite the front bin wall, the bin body further includes a first bin sidewall and a second bin sidewall opposite the first bin sidewall, the first bin sidewall is coupled between the front bin wall and the rear bin wall, the second bin sidewall is coupled between the front bin wall and the rear bin wall, the first multi-open position mechanism is closer to the first bin sidewall than to the second bin sidewall, the second multi-open position mechanism is closer to the second bin sidewall than to the first bin sidewall, and each of the first multi-open position mechanism and the second multi-open position mechanism is closer to the rear body wall than to the front body wall, the load floor is coupled to the storage bin solely by the first multi-open position mechanism and the second multi-open position mechanism, each of the first multi-open position mechanism and the second multi-open position mechanism solely includes the first link, the second link, the elastic member, the bracket, the first pivot pin, the second pivot pin, the third pivot pin, and the fourth pivot pin.

\* \* \* \* \*